US007010382B2

(12) United States Patent
Cheng et al.

(10) Patent No.: US 7,010,382 B2
(45) Date of Patent: Mar. 7, 2006

(54) METHOD AND SYSTEM FOR IMPROVING PROCESS CONTROL FOR SEMICONDUCTOR MANUFACTURING OPERATIONS

(75) Inventors: Chang Yung Cheng, Tainan Shien (TW); Bob Tseng, Hsinchu County (TW)

(73) Assignee: Taiwan Semiconductor Manufacturing Co., Ltd., (TW)

( * ) Notice: Subject to any disclaimer, the term of this patent is extended or adjusted under 35 U.S.C. 154(b) by 0 days.

(21) Appl. No.: 10/787,699

(22) Filed: Feb. 26, 2004

(65) Prior Publication Data

US 2005/0192698 A1 Sep. 1, 2005

(51) Int. Cl.
*G06F 19/00* (2006.01)
(52) U.S. Cl. .................. 700/121; 700/95; 700/108; 438/14
(58) Field of Classification Search ............. 700/90, 700/95, 108, 117, 121; 438/14
See application file for complete search history.

(56) References Cited

U.S. PATENT DOCUMENTS

| 6,460,002 | B1 * | 10/2002 | Bone et al. | .................... 702/81 |
| 6,556,884 | B1 * | 4/2003 | Miller et al. | ................. 700/121 |
| 6,560,503 | B1 * | 5/2003 | Toprac et al. | ............... 700/108 |
| 6,597,447 | B1 * | 7/2003 | Stirton et al. | ............. 356/237.2 |
| 6,647,309 | B1 * | 11/2003 | Bone | .......................... 700/121 |
| 6,823,231 | B1 * | 11/2004 | Bode et al. | ................. 700/121 |

* cited by examiner

*Primary Examiner*—Jayprakash N. Gandhi
(74) *Attorney, Agent, or Firm*—Duane Morris LLP

(57) ABSTRACT

A method and system are disclosed for configuring manufacturing tools in a semiconductor manufacturing flow. After collecting information with regard to one or more product performance features associated with a processing step performed in a process tool, one or more undesired process tool performance excursion patterns may be determined based on the collected information. On the other hand, operational and processing parameters of the process tool are monitored while conducting the processing step. Non-conformance faults of the monitored operational and processing conditions are detected and classified. A correlation between the classified non-conformance faults with the determined excursion patterns is made for adjusting one or more processing parameters of the processing tool.

22 Claims, 5 Drawing Sheets

METHOD AND SYSTEM FOR IMPROVING PROCESS CONTROL FOR SEMICONDUCTOR MANUFACTURING OPERATIONS

BACKGROUND

The present disclosure relates generally to semiconductor device manufacturing, and more particularly to a method for integrating real-time process tool data, process tool fault detection and the in-line product metrology data for improved process control and capabilities.

The manufacture of semiconductor integrated circuits (ICs) and devices require the use of many production process steps to define and create the circuit components and circuit layouts of the product device. The numerous process steps require the use of many tools, both production and support related. Semiconductor factories remain competitive by continuously seeking new methods and practices for improving process yields, product yields, quality, reliability and lower production costs. To help accomplish these, tremendous amounts of effort have been focused upon monitoring aspects of the tools' hardware and processes to ensure and maintain stability, repeatability and yields. In-line product measurements are performed as additional checks to verify these efforts. Such monitoring and check techniques are common methods for controlling process and tool stability and capabilities.

Many conventional production tool monitoring methodologies include tool fault detection and classification (FDC) systems to monitor for and catch drifting and/or shifted tools which will cause processes to go out of control. Metrology tools are used for measuring certain details of the product immediately in-line after undergoing processing operations through specified production tools. The methodologies may also include advance process control (APC) systems by which the in-line measured product metrology is tracked for trend performance. The APC systems will often incorporate algorithms by which pre-determined responses are triggered based upon programmed data trend and excursion patterns. Such responses may involve the re-adjustment of the process tools' processing parameters such that the in-line product measured parameter is tweaked or re-centered back into a desirable performance trend or range.

FIG. 1 illustrates a process and tool control flow diagram 100 for a conventional semiconductor processing operation. The process starts with a given product having been processed through a production tool 102. A metrology tool 104 is then used to measure a certain product performance feature associated with the processing through the production tool 102. The measured metrology data is then sent to a metrology database 106 for storage and assimilation. The APC system controller 108 then judges the stored metrology data 106 to determine if undesired process, tool performance data trends and/or excursion patterns have developed. Run-based algorithms incorporated into the APC 108 may then be used to calculate and feed back processing parameter adjustments 110 to the process tool 102 in an attempt to re-center the measured product metrology index 106 that is produced by the drifted or shifted process tool 102.

A tool fault detection, classification system (FDC) 112 may be used to independently monitor and classify specific errors and faults for the process tool 102. The FDC system 112 monitors and classifies tool faults 114 by checking the operational and processing conditions for conformance to pre-defined limits. When certain faults 114 are detected and classified, the FDC system 112 will typically react with pre-determined responses to raise alerts and/or tool, process shutdowns as required and defined by the manufacturing operations.

The described conventional control methodology is somewhat effective for maintaining process and tool control. However, there are inherent inefficiencies to the system. The methodology is not real-time controlled as there are time lags from the time the production material is processed through the tools and to the time the APC controller reviews the in-line product data and prescribes possible tool process parameter adjustments. This lag time may allow for additional, undesired production material to be processed through a drifting or shifted tool. The APC system depends largely upon the metrology tool data. If the metrology system and/or measurements are defective themselves, the APC may be led to wrong, incorrect responses. The overall methodology responds to symptoms that are manifested upon a measured aspect of the product, rather than responding to the tool's root cause factor of the process tool's shift and/or drift. Process parameters adjustments made by the APC system may not necessarily fix and resolve the root cause issue with the process tool. There is not a direct relational correlation established between the tool root cause drift/shift factors to the process resultant control and symptoms. The FDC is an independent system that does not have any direct influence upon the adjusted process parameters as prescribed by the APC. Without such direct ties, the process tool control methodology may at times become inefficient causing multiple parameter adjustments and metrology check iteration loops as the APC utilizes indirect symptomatic product data to adjust process parameters in the attempt to fix and correct a tool drift/shift root cause issue.

What are needed are improved methods that reduce the response times to react to the product data, thus reducing the incidences of flawed product material.

SUMMARY

A method and system are disclosed for configuring manufacturing tools in a semiconductor manufacturing flow. After collecting information with regard to one or more product performance features associated with a processing step performed in a process tool, one or more undesired process tool performance excursion patterns may be determined based on the collected information. On the other hand, operational and processing parameters of the process tool are monitored while conducting the processing step. Non-conformance faults of the monitored operational and processing conditions are detected and classified. A correlation between the classified non-conformance faults with the determined excursion patterns is made for adjusting one or more processing parameters of the processing tool.

These and other aspects and advantages will become apparent from the following detailed description, taken in conjunction with the accompanying drawings, illustrating by way of example the principles of the disclosure.

DESCRIPTION

The present disclosure describes a method and process and tool control system incorporating real-time process tool data, process tool fault detection/classification (FDC), and the in-line product metrology data. Some illustrated examples feature control feedback loops by which product and tool data are utilized in real-time to determine tool root cause correction(s) to minimize the output of undesired production material. In this disclosure, the process parameters are adjusted by incorporating inputs from the tools, as much closely representative of the root cause issues as possible. The use of the FDC system is an integral part of the control methodology, taking advantage of their capabilities to obtain real-time tool and operations data. This added level of tool process monitor and control, through data processing by a real-time FDC controller, will provide an additional feedback response system for improved process control and capabilities. In one example, a dual feedback, control loop is used which allows the control loops to support and confirm the decision/response algorithms of each other. The improve methods will allow semiconductor manufacturing facilities to achieve a much higher level of process and tool control, leading to improved product/process yields, and lower production costs while not compromising on product quality/reliability and tool control/reliability.

Figure 1:
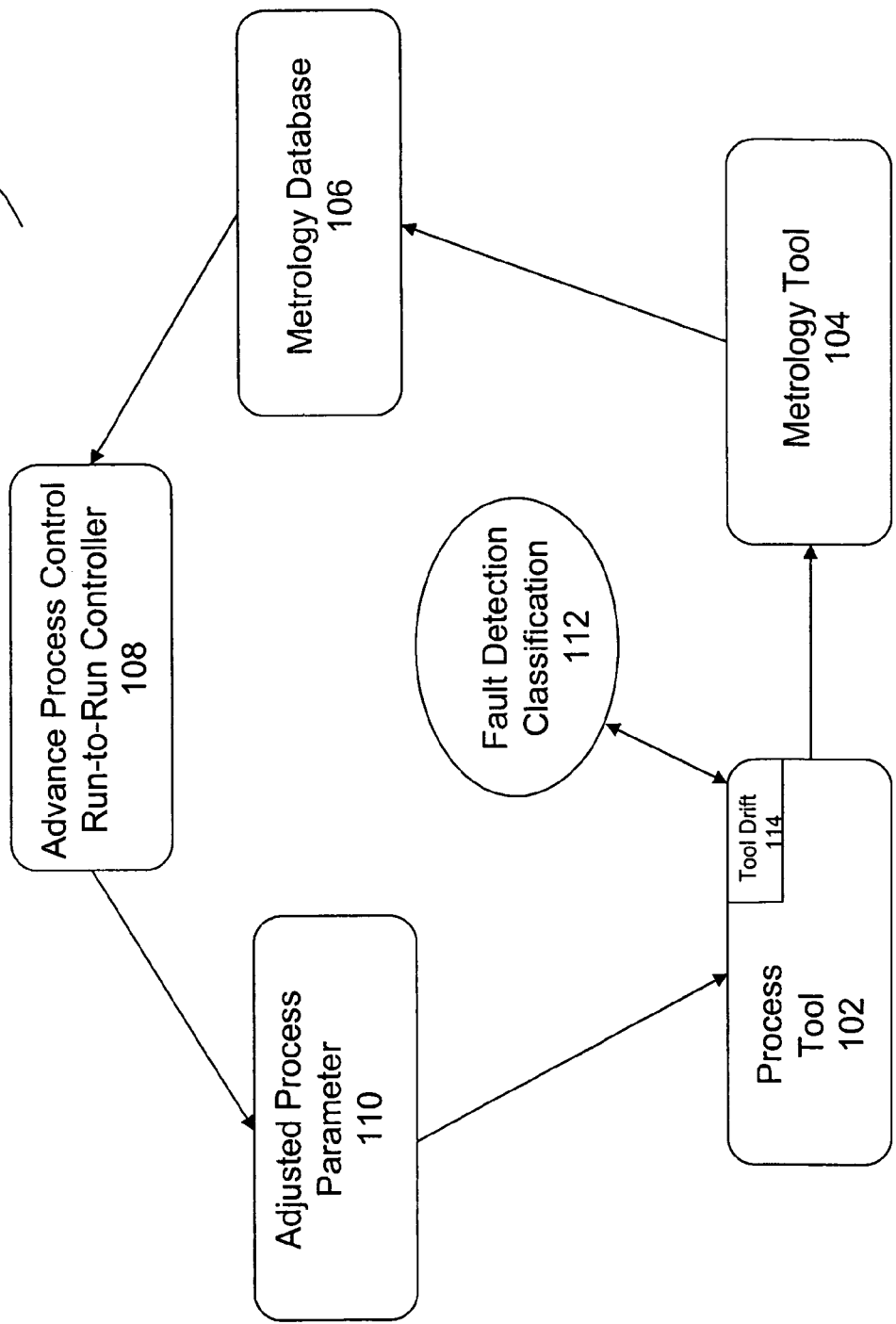
FIG. 1 is a flow diagram illustrating a process and tool control methodology in a conventional semiconductor processing operation.
Figure 2:
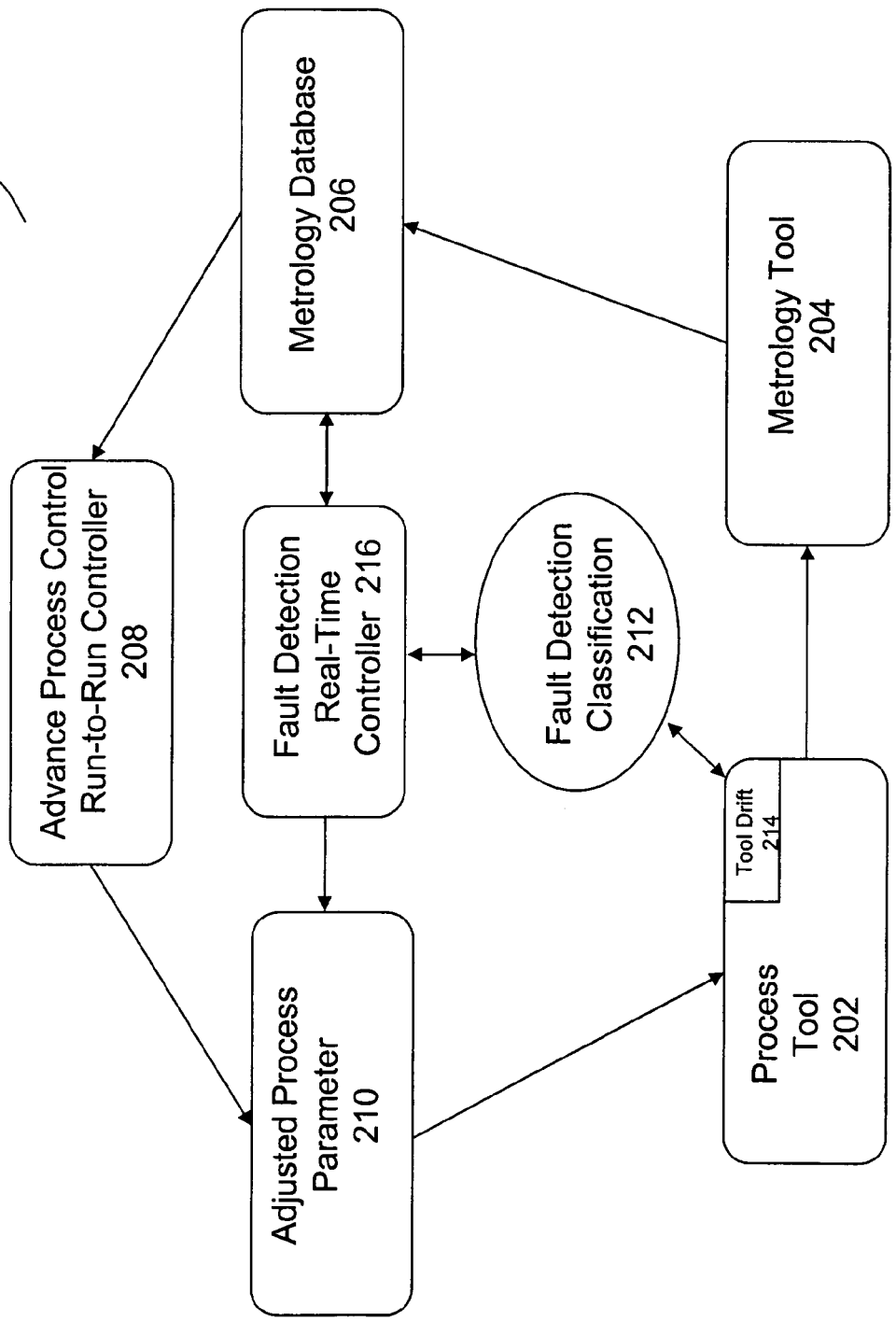
FIG. 2 is a flow diagram illustrating an improved process and tool control method for a semiconductor processing operation in accordance with one example of the present disclosure.

Referring to FIG. 2, is a flow diagram 200 illustrating a process and tool control method for a semiconductor processing operation in accordance with one example of the present disclosure. The diagram starts with a given product having been processed through a production/process tool 202. A metrology tool 204 is then used to measure certain product performance features associated with the processing through the production tool 202. This is typically done on a run-by-run basis, and the post-run measurements are conducted routinely. The measured metrology data is then sent to a metrology database 206 for storage and assimilation. The APC system controller 208 then judges the stored metrology data 106 to determine if undesired process, tool performance data trends and/or excursion patterns have developed. Run-based algorithms incorporated in the APC 208 may then be used to calculate and feed back processing parameter adjustments data or suggestions 210 to the process tool 202 in an attempt to re-center the measured product metrology index, which may be stored in the database 206, that is produced by the drifted or shifted process tool 202. While re-centering the measured product metrology index, various factors may be considered based on the information collected by the metrology tool 204 and the APC run-to-run controller 208. It is understood that the adjustment suggestions made by the APC can be applied to the production tool right away when it is available or can be combined with adjustment data generated by a fault detection controller. It would be further explained below that tool fault detection information will also be considered for forming the best set of adjustments.

A tool fault detection and classification system (FDC) 212 is used to monitor and classify specific errors and faults for the process tool 202 in real time. The FDC 212 system monitors and classifies tool faults 214 by the checking of the operational and processing conditions for conformance to pre-defined limits. When certain non-conformance faults 214 are detected and classified, the FDC system 212 relays the information to the fault detection/classification real-time controller 216 (FDCRTC). The FDCRTC 216 then analyzes and correlates the classified tool fault 214 to the processing data held within the metrology database 206. The FDCRTC 216 contains algorithms for determining adjustments to process parameters 210 that may be immediately fed back to the process tool 202. These algorithms are pre-determined based upon process, tool characterization modeling that has been performed for the processing operation. Such modeling identifies and correlates key tool performance parameters and indices to the key product electrical and/or physical performance features. The key tool parameters and indices are set to be monitored and classified by the FDC 212 system as are the key product electrical and/or physical features set to be measured at the post-process metrology 204 operations. Typical techniques for tool/process characterization modeling may include, design of experiments (DOE), data mining (historical parameter correlations), as well as theoretical calculations and extrapolations.

In this example, the process and tool control loop incorporates the FDCRTC 216 utilizing data from both the FDC 212 and the APC 208, as well as the metrology database 206. It is noted that, in this example, the FDCRTC controller 216 serves as the main control for the tool and process control of the operation in a real time fashion and the APC system controller 208 exists as a supplement tool and process control system to not only backup the FDCRTC, but also to help judge the stored metrology data to determine if more long-termed undesired tool or process performance data trends and/or excursion patterns have developed. Run-based algorithms incorporated into the APC 208 may also be used to calculate and feed back processing parameter adjustments 210 to the process tool 202 in an attempt to re-center the measured product metrology index that is produced by the drifted or shifted process tool 202. Process parameters are adjusted according to a combination of FDC monitoring and the metrology data. It is further noticed that relational information for the classified faults, the determined excursion patterns, and the processing parameters of the processing tool is continuously accumulated and processed for establishing better data processing models so that future adjustments can be made with more accuracy.

Figure 3:
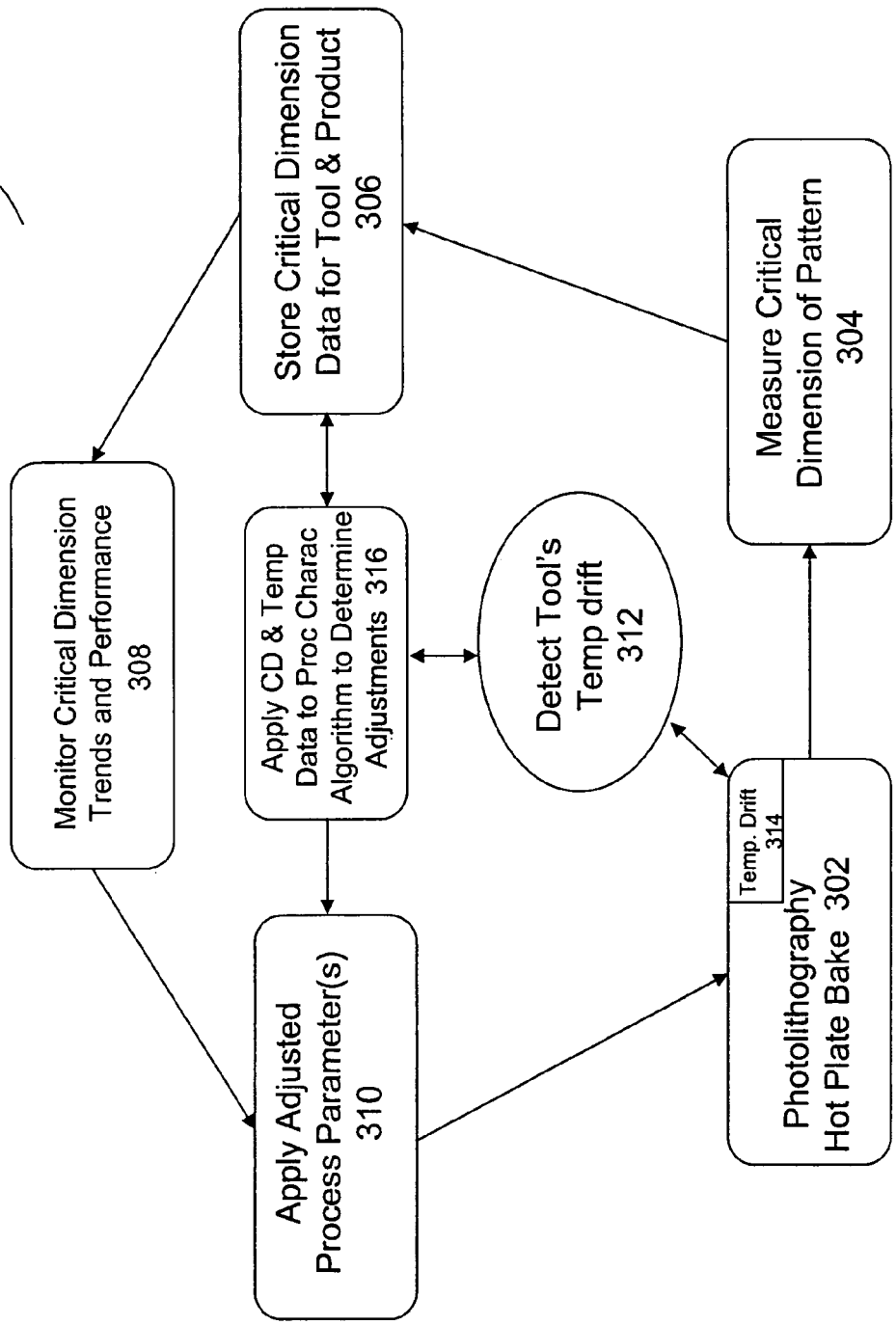
FIG. 3 is a flow diagram illustrating an example of the process and tool control method for a photolithography hot plate bake processing operation in accordance with the present disclosure.

FIG. 3 is a diagram 300 illustrating an example for applying the above described process and tool control method in a semiconductor photolithography hot plate bake process. The diagram 300 starts with a given product having been processed through a photolithography hot plate bake tool 302. A metrology tool 304 is then used to measure a critical dimension (CD) feature of the processed product. The CD feature measured has been previously characterized via past process/tool modeling and correlations to processing parameters of the hot plate bake tool 302. The measured CD data is then sent to the metrology database 306 for storage and assimilation for review. The APC system controller 308 then judges the stored CD data to determine if undesired tool, process performance data trends and/or excursion patterns have developed. Run-based algorithms incorporated into the APC 308 may then be used to calculate and feed back processing parameter adjustments 310 for the hot plate bake tool 302, thereby attempting to re-center the measured product CD that is produced by the drifted or shifted hot plate bake tool 302.

A tool fault detection, classification system (FDC) 312 is also used to monitor and classify specific errors and faults for the hot plate bake tool 302 in real time. The FDC 312 system monitors and classifies tool faults 314 by checking the operational and processing conditions for conformance to pre-defined limits. If the process temperature 314 of the hot plate bake tool 302 becomes an issue, the temperature fault 314 is detected and classified. The FDC system 312 then relays the temperature fault 314 information to the fault detection/classification real-time controller (FDCRTC) 316. The FDCRTC 316 analyzes the temperature fault data 314 and correlates the data to the measured CD metrology data 304 held within the metrology database 306. The FDCRTC 316 utilizes stored decision algorithms for determining adjustments to process parameters 310 that may be immediately fed back to the hot plate bake tool 302. These decision algorithms are pre-determined based upon previous process/tool characterization modeling that has been performed for to correlate hot plate bake temperature with the CD response data of the product feature. As a result, the FDCRTC 316 calculates, determines parameters adjustments 310 for the hot plate bake tool 302 process. In this example, such adjustments may include a new process temperature setting, a new thermocouple calibration setting, and/or process time adjustment, depending upon the algorithms established by the process models.

The process and tool control loop as shown incorporating the FDCRTC 316 utilizes data from both the FDC 312 and the metrology database 306 contributes significantly to the accuracy of the adjustment. It is noted that the FDCRTC controller 316 serves as a first control module for the monitoring and management of the hot plate bake operation and the APC system controller 308 operates as a second control module to work with the FDCRTC to utilize all CD metrology data available to determine if more long-termed undesired tool, process performance data trends and/or excursion patterns have developed and to device any appropriate adjustment of the tool 302.

The described process and tool control method and system as structured in accordance with the present disclosure integrates the use of real-time process tool data, process tool fault detection and the in-line product metrology data together for improved process control and process capabilities. The input of real-time tool and operations data allow the disclosed method to immediately respond directly to tool root cause issues, thereby reducing the amount of undesired product, product reworks, out-of-control product and poor process/product yields. The establishment and monitoring of yield correlations between process tool parametric indices to measured product metrology allows for the processing operations to receive continuous feedback and adjustment opportunities to continuously improve process, tool capabilities, product consistency/repeatability and reliability.

The method and system disclosed are more robust with information from both the APC and FDC serving each other as supplemental and confirmation support. The real-time data provides a greater database of tool, process and product information for improved data analysis and yield correlations to further improve parametric adjustment algorithms for more accurate process control. Therefore, the disclosed method and system provides opportunities for accelerating the growth of the technology knowledge bases for the tools, processes and product performance.

For illustrating the present disclosure, the photolithography hot plate bake processing operation is used, but it is understood that the disclosed method is applicable for all processes within the manufacturing operations of a semiconductor facility. The process, tool control method of the present disclosure will provide significant cost improvements for a given production facility through improvements to operational costs, process and product yields, as well as improved process capabilities for the production tools and defined processes.

Figure 4:
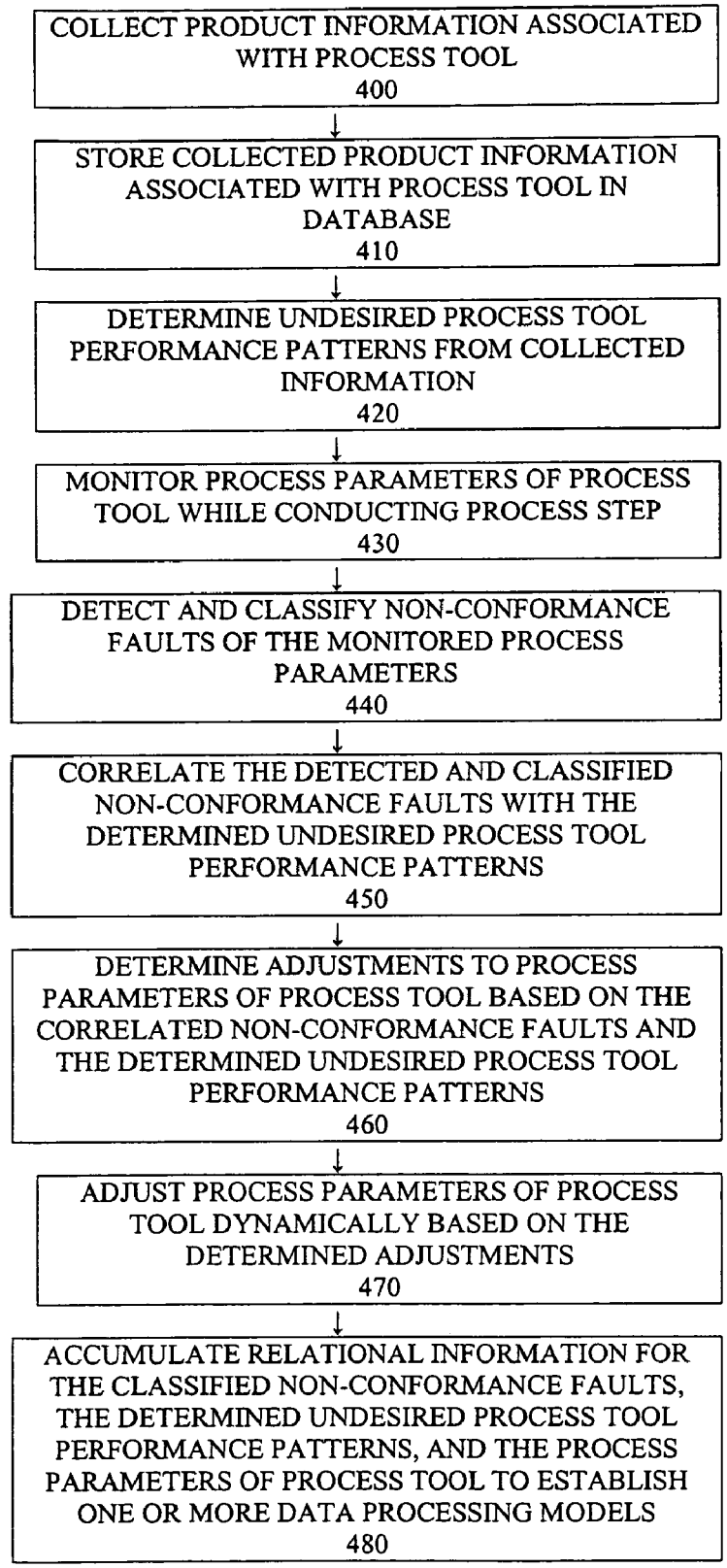
FIG. 4 is a flowchart illustrating an example of the tool control method of the present disclosure.

FIG. 4 is a flowchart illustrating an example of the tool control method of the present disclosure. In box 400, information regarding one or more product performance features associated with a processing step performed in a process tool is collected. In box 410, the collected information is stored in a database. In box 420, one or more undesired process tool performance excursion patterns based on the collected information are determined. In box 430, operational and processing parameters of the process tool are monitored while conducting the processing step. In box 440, non-conformance faults of the monitored operational and processing conditions are detected and classified in real-time. In box 450, the classified non-conformance faults are correlated with the determined excursion patterns. In box 460, the adjustments to the process parameters of the process tool are determined based on the correlated non-conformance faults and determined excursion patterns. In box 470, the process parameters of the process tool are dynamically adjusted based on the determined adjustments. In box 480, relational information for the classified non-conformance faults, the determined undesired process tool performance patterns, and the process parameters of the process tool are accumulated to establish one or more data processing models.

Figure 5:
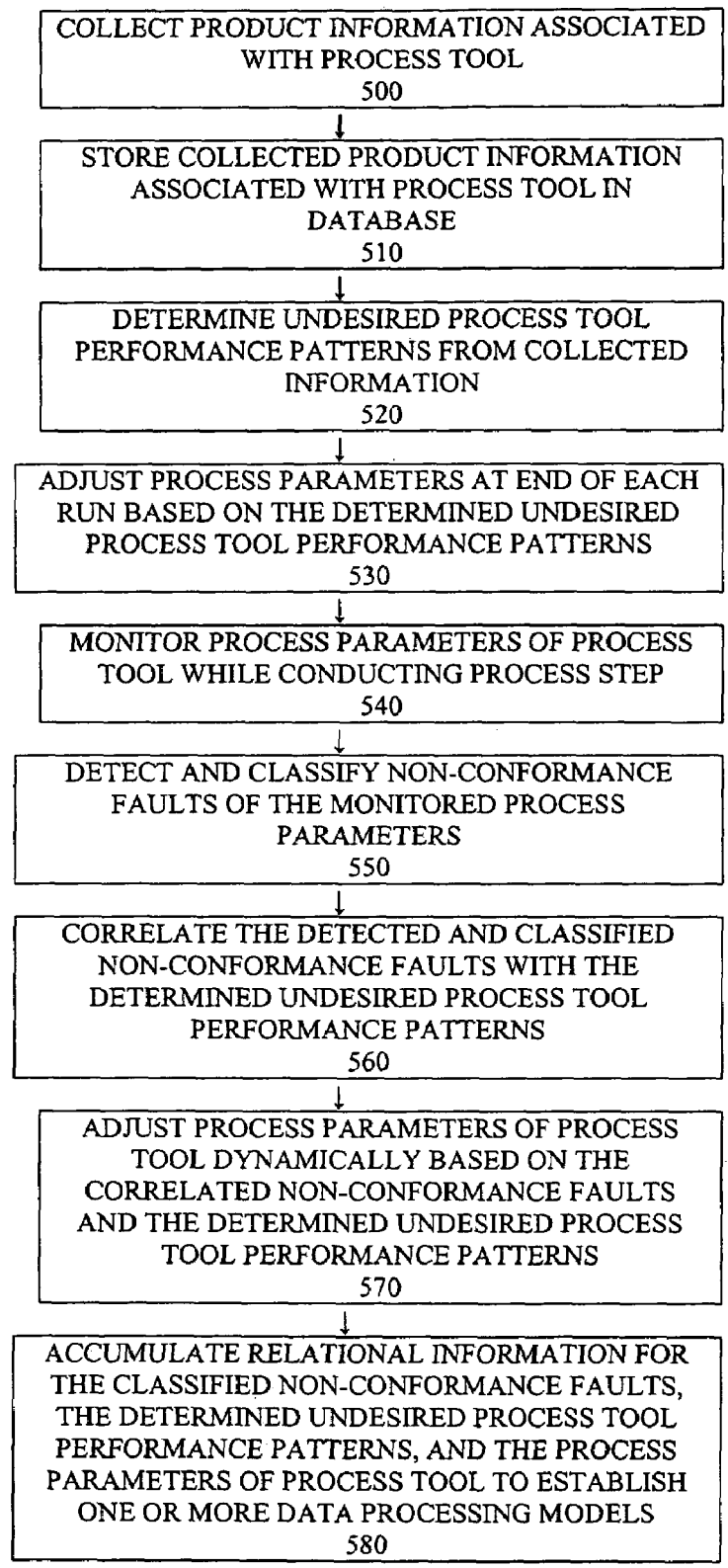
FIG. 5 is a flowchart illustrating another example of the tool control method of the present disclosure.

FIG. 5 is a flowchart illustrating another example of the tool control method of the present disclosure. In box 500, information regarding one or more product performance features associated with a processing step performed in a process tool is collected. In box 510, the collected information is stored in a database. In box 520, one or more undesired process tool performance excursion patterns based on the collected information are determined. In box 530, one or more of the process parameters are adjusted at the end of each run based on the determined undesired process tool performance patterns. In box 540, operational and processing parameters of the process tool are monitored while conducting the processing step. In box 550, non-conformance faults of the monitored operational and processing conditions are detected and classified in real-time. In box 560, the classified non-conformance faults are correlated with the determined excursion patterns. In box 570, the process parameters of the process tool are dynamically adjusted based on the correlated classified non-conformance faults and the determined excursion patterns. In box 580, relational information for the classified non-conformance faults, the determined undesired process tool performance patterns, and the process parameters of the process tool are accumulated to establish one or more data processing models.

The method disclosed is suitable and compatible for implementation within existing, conventional and future semiconductor fabrication facilities and product/process technologies. Specific examples of components and processes are described to help clarify the disclosure. These are, of course, merely examples and are not intended to limit the scope of the disclosure from that described in the claims. It will be understood by those skilled in the art that various changes in form and detail may be made therein without departing from the spirit and scope of the invention, as set forth in the following claims.

What is claimed is:

1. A method for configuring manufacturing tools in a semiconductor manufacturing flow, the method comprising:
collecting information with regard to one or more product performance features associated with a processing step performed by a process tool;
determining one or more undesired process tool performance excursion patterns based on the collected information;
monitoring operational and processing parameters of the process tool while conducting the processing step;
real-time detecting and classifying non-conformance faults of the monitored operational and processing parameters;
correlating the classified non-conformance faults with the determined excursion patterns; and
adjusting one or more of the operational and processing parameters of the process tool dynamically based on the correlated non-conformance faults and the determined excursion patterns.

2. The method of claim 1 wherein the collecting further includes collecting the information for each run of the processing step performed by the process tool.

3. The method of claim 1 further comprises storing the collected information in a database.

4. The method of claim 1 wherein the determining further includes providing feedback suggestions to the process tool for adjusting the operational and processing parameters.

5. The method of claim 1 further comprising determining adjustments to the operational and processing parameters based on the correlated non-conformance faults and the determined excursion patterns.

6. The method of claim 5 wherein the determining adjustments further includes using one or more data processing models identifying and correlating one or more predetermined tool performance parameters and indices with the product performance features for generating adjustment data.

7. The method of claim 1 further comprising accumulating relational information for the classified non-conformance faults, the determined excursion patterns, and the operational and process parameters of the process tool for establishing one or more data processing models.

8. The method of claim 1 wherein the product performance features includes predetermined product electrical performance features.

9. The method of claim 1 wherein the product performance features includes predetermined product physical performance features.

10. A method for configuring manufacturing tools in a semiconductor manufacturing flow, the method comprising:
collecting information with regard to one or more product performance features associated with a processing step performed in each run of a process tool;
determining one or more undesired process tool performance excursion patterns based on the collected information;
adjusting one or more operational and processing parameters of the process tool at the end of each run based on the determined undesired process tool performance excursion patterns;
monitoring one or more of the operational and processing parameters of the process tool while conducting the processing step;
real-time detecting and classifying non-conformance faults of the monitored operational and processing parameters;
correlating the classified non-conformance faults with the determined excursion patterns; and
adjusting one or more of the operational and processing parameters of the process tool dynamically based on the correlated non-conformance faults and the determined excursion patterns,
wherein the adjustments made dynamically and at the end of each run complement each other for better configuring of the process tool.

11. The method of claim 10 further comprising storing the collected information for each run of the processing step in a database.

12. The method of claim 10 wherein the adjusting further includes using one or more data processing models which identify and correlate one or more predetermined tool performance parameters with the product performance features for generating adjustment data.

13. The method of claim 10 further comprising accumulating relational information for the classified non-conformance faults, the determined excursion patterns, and the operational and processing parameters of the process tool for establishing one or more data processing models.

14. The method of claim 10 wherein the product performance features includes predetermined product electrical performance features.

15. The method of claim 10 wherein the product performance features includes predetermined product physical performance features.

16. A system for configuring manufacturing tools in a semiconductor manufacturing flow, the system comprising:
a metrology tool for collecting information with regard to one or more product performance features associated with a processing step performed by a process tool;
a process controller for determining one or more undesired process tool performance excursion patterns based on the collected information;
a fault detection and classification module for monitoring operational and processing parameters of the process tool while conducting the processing step and for real-time detecting and classifying non-conformance faults of the monitored operational and processing parameters; and
a fault detection and classification controller for correlating the classified non-conformance faults with the determined excursion patterns for adjusting one or more of the operational and processing parameters of the process tool dynamically.

17. The system of claim 16 further comprises a database for storing the collected information.

18. The system of claim 16 wherein the fault detection and classification controller further determines adjustments to the operational and processing parameters based on the correlated non-conformance faults and the determined excursion patterns.

19. The system of claim 16 wherein the fault detection and classification controller further includes one or more data processing models identifying and correlating one or more predetermined tool performance parameters with the product performance features for generating adjustment data.

20. The system of claim 19 wherein the fault detection and classification controller further includes programs for accumulating relational information for the classified non-conformance faults, the determined excursion patterns, and the operational and processing parameters of the process tool for establishing one or more data processing models.

21. The system of claim 16 wherein the product performance features includes predetermined product electrical performance features.

22. The system of claim 16 wherein the product performance features includes predetermined product physical performance features.

* * * * *

UNITED STATES PATENT AND TRADEMARK OFFICE
CERTIFICATE OF CORRECTION

PATENT NO. : 7,010,382 B2  Page 1 of 1
APPLICATION NO. : 10/787699
DATED : March 7, 2006
INVENTOR(S) : Cheng, Chang Yung It is certified that error appears in the above-identified patent and that said Letters Patent is hereby corrected as shown below:

Claim 7, column 7, line 42, delete the first occurrence of the word "process" and Insert — processing--.

Signed and Sealed this

Fifteenth Day of August, 2006

JON W. DUDAS
*Director of the United States Patent and Trademark Office*